(12) United States Patent
Ciklakarsli et al.

(10) Patent No.: US 10,106,113 B2
(45) Date of Patent: Oct. 23, 2018

(54) HOLLOW PROFILED ELEMENT HAVING DEPRESSIONS

(71) Applicant: AUDI AG, Ingolstadt (DE)

(72) Inventors: Esref Ciklakarsli, Bad Friedrichshall (DE); Matthias Gotthelf, Neudenau (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/543,321

(22) PCT Filed: Jan. 14, 2016

(86) PCT No.: PCT/EP2016/000065
§ 371 (c)(1),
(2) Date: Jul. 13, 2017

(87) PCT Pub. No.: WO2016/113136
PCT Pub. Date: Jul. 21, 2016

(65) Prior Publication Data
US 2017/0355331 A1 Dec. 14, 2017

(30) Foreign Application Priority Data
Jan. 17, 2015 (DE) .......... 10 2015 000 548

(51) Int. Cl.
*B62D 21/15* (2006.01)
*B60R 19/34* (2006.01)
*B60R 19/18* (2006.01)

(52) U.S. Cl.
CPC ............ *B60R 19/34* (2013.01); *B62D 21/152* (2013.01); *B60R 2019/1813* (2013.01); *B62D 21/157* (2013.01)

(58) Field of Classification Search
CPC .... B62D 21/15; B62D 21/152; B62D 21/157; B60R 19/34; B60R 2019/182; B60R 2019/1813; F16F 7/12
(Continued)

(56) References Cited

U.S. PATENT DOCUMENTS 5,046,777 A * 9/1991 Garnweidner ......... B60J 5/0444
296/146.6
5,431,445 A 7/1995 Wheatley
(Continued)

FOREIGN PATENT DOCUMENTS

DE 19540384 A1 5/1996
DE 19959701 A1 6/2001
(Continued)

OTHER PUBLICATIONS

International Search Report and Written Opinion dated Mar. 22, 2016 of corresponding application No. PCT/EP2016/000065; 12 pgs.
(Continued)

*Primary Examiner* — Dennis H Pedder
(74) *Attorney, Agent, or Firm* — Maier & Maier, PLLC

(57) ABSTRACT

A hollow profiled element, includes a plurality of longitudinal edges, which extend in a longitudinal direction and are connected by side walls, wherein a longitudinal edge has at least one depression, the depression base of which extends transversely to the longitudinal direction and at an angle to the side walls forming the longitudinal edge. According to an embodiment of the invention, a side wall forming the longitudinal edge has a transversely extending bulge in the region of the depression, wherein the depression base transitions at the end into the bulge in the region of said side wall and the bulge is designed with a shape that has a convex form in the transition to the depression and drops to the level
(Continued)

of the side wall before an opposite longitudinal edge is reached.

6 Claims, 3 Drawing Sheets

(58) Field of Classification Search
USPC .............. 296/187.03, 187.09, 187.1, 187.11, 296/187.12, 203.01, 203.02, 203.03, 296/203.04; 280/784, 796–798
See application file for complete search history.

(56) References Cited

U.S. PATENT DOCUMENTS

| | | | | |
|---|---|---|---|---|
| 5,462,325 | A * | 10/1995 | Masuda | ................ B60R 19/18 293/102 |
| 6,672,654 | B2 * | 1/2004 | Yamada | ................... F16F 7/12 296/146.6 |
| 2010/0019518 | A1 | 1/2010 | Stewart et al. | |

FOREIGN PATENT DOCUMENTS

| DE | 102011119092 A1 | 5/2013 |
|---|---|---|
| WO | 2006/042032 A2 | 4/2006 |

OTHER PUBLICATIONS

Notification of Transmittal of Translation of the International Preliminary Report on Patentability dated Jul. 27, 2017, in connection with corresponding international application No. PCT/EP2016/000065 (6 pgs.).

* cited by examiner

HOLLOW PROFILED ELEMENT HAVING DEPRESSIONS

FIELD

The invention relates to a hollow profiled element comprising a plurality of longitudinal edges that extend in a longitudinal direction and are connected by side walls according to the preamble of patent claim 1. The invention further relates to a motor vehicle body having a hollow profiled element according to the invention for use as side member or cross member.

BACKGROUND

A generic hollowed profile element is known from DE 10 2011 119 092 A1. This hollow profiled element is designed as a side member having a plurality of inner webs for creating a multichamber structure and is provided for a support structure of a motor vehicle. In order to make possible an improvement in the adjustment of the initial force level as well as the force-displacement course in the case of a motor vehicle collision, a plurality of material weak points at the hollow profiled element are proposed. Thus, on the one hand, as material weak points, recesses are provided at the inner webs and, on the other hand, depressions are provided at the edges of the hollow profiled element. With such a hollow profiled element, which has recesses at the inner walls and depressions at the edges, it is possible to achieve a predefined course of deformation or crumpling of the side member. Moreover, the side member is to be prevented from buckling in an uncontrolled manner.

SUMMARY OF THE DISCLOSURE

The object of the invention is to further develop or enhance the hollow profiled element mentioned in the introduction in an advantageous manner, so that the response behavior of the hollow profiled member is improved in regard to the course of deformation when it is subjected to crash forces.

This object is achieved by a hollow profiled element having the features of patent claim 1.

Such a hollow profiled element comprising a plurality of longitudinal edges, which extend in a longitudinal direction and are connected by side walls, wherein a longitudinal edge has at least one depression, the depression base of which extends transversely to the longitudinal direction and at an angle to the side walls forming the longitudinal edge, is characterized according to the invention in that a side wall forming the longitudinal edge has a transversely extending bulge in the region of the depression, wherein the depression base transitions into the bulge at the end in the region of said side wall, and the bulge is designed with a shape that has a convex form in the transition to the depression and drops to the level of the side wall before an opposite-lying longitudinal edge is reached.

With this hollow profiled element according to the invention, the parameter values of a depression, defined by the depth of the depression, the angle of the depression, and the radius of the depression, which influence the deformation behavior of a hollow profiled element, are substantially expanded by the bulge continuing through the depression. The geometric design of this bulge in regard to height, width, and length as well as shape affords further possibilities of adjustment in terms of a desired deformation and response behavior; in particular, the force-displacement course and the site of the deformation can be controlled in a specific manner.

Advantageously, in the case of this hollow profiled element according to the invention, it is not required for the depth of the depression to be enlarged, so that it is also possible to use high-strength aluminum alloys, which would only be possible to a limited extent otherwise, for the hollow profiled element according to the invention.

According to an advantageous enhancement of the invention, the further side wall forming the longitudinal edge has a transversely extending further bulge in the region of the depression, wherein the depression base transitions into the bulge at the end in the region of said further side wall. By means of this embodiment of the invention, the base of the depression transitions into a bulge at the end at the adjacent side walls. As a result of this, the possibilities of adjustment in regard to a desired deformation and response behavior are further increased.

According to an advantageous implementation of the invention, it is provided that the hollow profiled element is designed for forming a multichamber structure with an inner web extending in the longitudinal direction, said web connecting the side wall having the bulge to an opposite-lying side wall and the bulge being designed with an end in the region of connection of the inner web to said side wall. The hollow profiled element according to the invention can, of course, be designed with a plurality of inner webs or inner walls. Preferably, it is provided that, at the opposite-lying longitudinal edge, which is formed by the side wall with the bulge, a further depression having a further bulge is formed and the further bulge is formed likewise with an end in the region of connection of the inner web to the side wall. In this case, it is advantageous that the two bulges are each formed with a course that is flush to the other bulge transversely to the longitudinal direction.

In an advantageous manner, the hollow profiled element is designed as a side member or as a cross member for a motor vehicle body.

BRIEF DESCRIPTION OF THE DRAWINGS

The invention will be described in detail below on the basis of exemplary embodiments with reference to the appended figures. Shown are.

DETAILED DESCRIPTION

Figure 1:
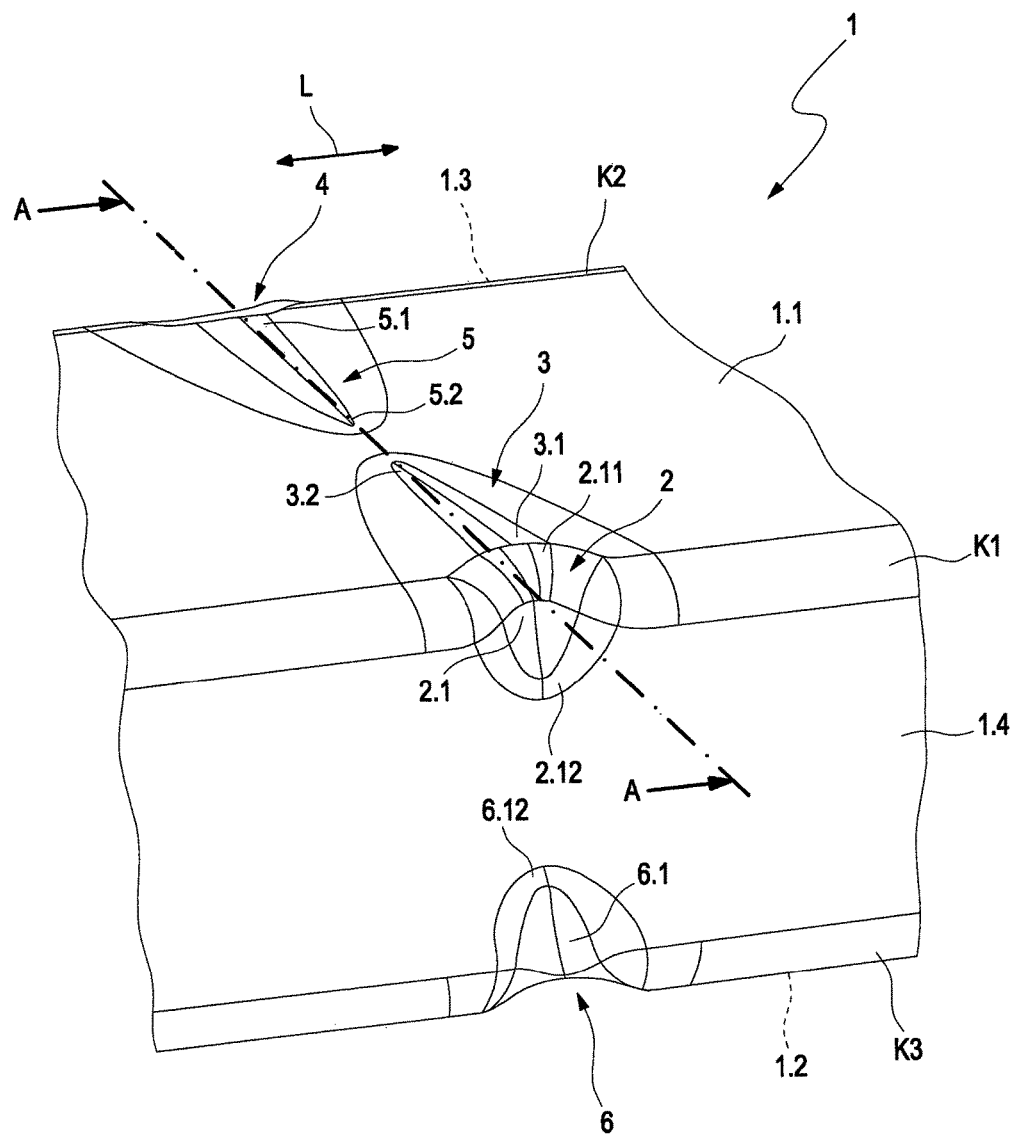
FIG. 1 a perspective and schematic partial view of a hollow profiled element as an exemplary embodiment of the invention, FIG. 2 a sectional illustration of the cut A-A according to FIG. 1, and FIG. 3 a sectional illustration of a hollow profiled element as another exemplary embodiment of the invention.
Figure 2:
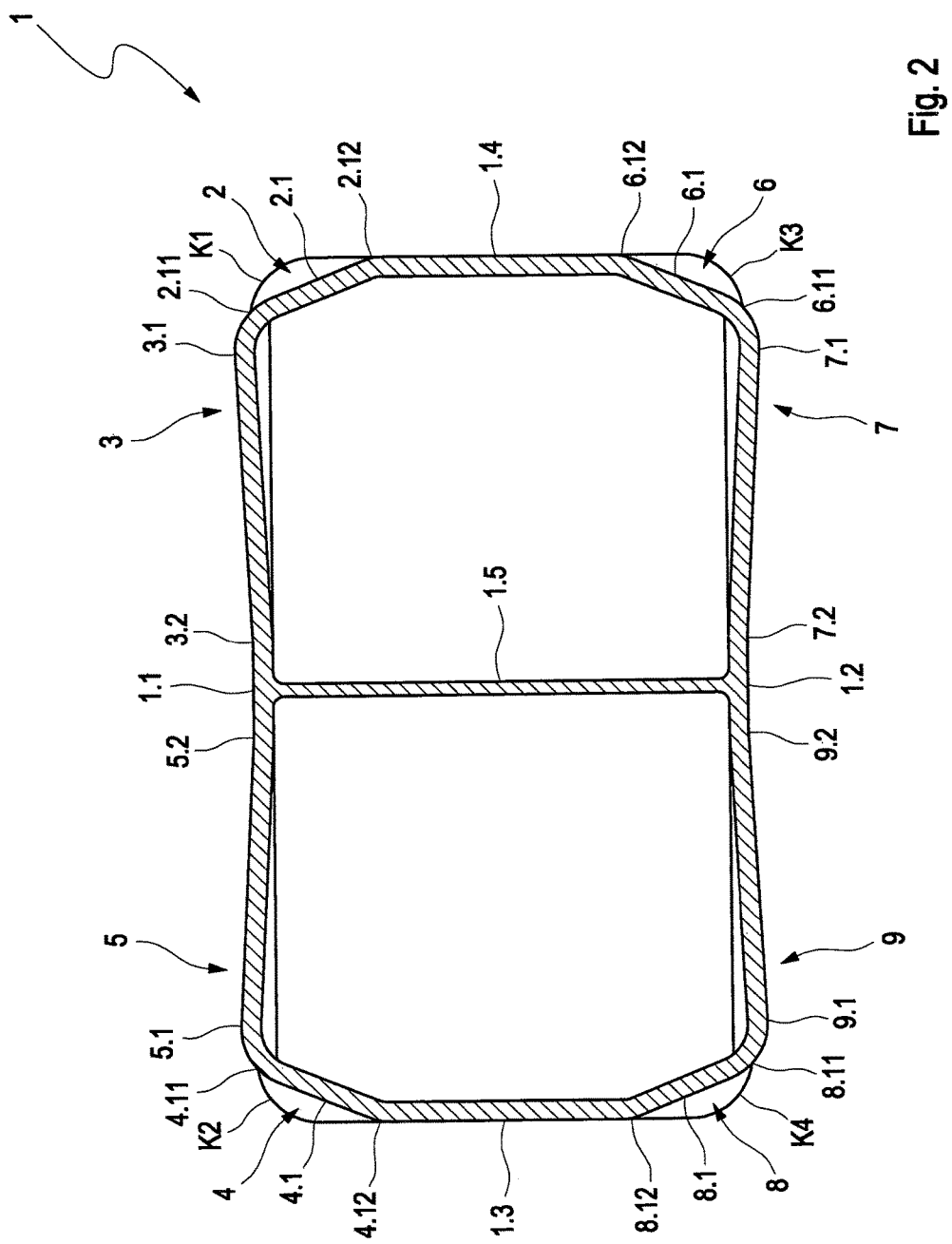

In accordance with FIGS. 1 and 2, the hollow profiled element 1 used for a side member of a motor vehicle body has a rectangular cross section with four side walls 1.1, 1.2, 1.3, and 1.4 extending in the longitudinal direction L. Every two of these side walls 1.1 to 1.4 together form a longitudinal edge of the hollow profiled element 1. A first longitudinal edge K1 is formed by the side walls 1.1 and 1.4, a second longitudinal edge K2 is formed by the side walls 1.1 and 1.3, a third longitudinal edge K3 is formed by the side walls 1.2 and 1.4, and a fourth longitudinal edge K4 is formed by the side walls 1.2 and 1.3. Furthermore, this hollow profiled element 1 is designed as a multichamber structure, wherein the two opposite-lying side walls 1.1 and 1.2 are connected centrally by an inner web 1.5.

Furthermore, it can be seen from FIGS. 1 and 2 that, in the sectional plane formed by the cut A-A according to FIG. 1, four depressions are impressed in the longitudinal edges around the periphery. Thus, the longitudinal edge K1 has a depression 2, the longitudinal edge K2 has a depression 4, the longitudinal edge K3 has a depression 6, and the longitudinal edge K4 has a depression 8. The depression bases 2.1, 4.1, 6.1, and 8.1 of each of these depressions 2, 4, 6, and 8 extend transversely to the longitudinal direction L and at an angle with respect to the adjacent side faces 1.1 and 1.4, 1.1 and 1.3, 1.2 and 1.4, or 1.2 or 1.3. In the ideal case, a depression base forms an angle of approximately 45° with the respective associated side wall.

Each of the depressions 2, 4, 6, and 8 transitions into a bulge 3, 5, 7, and 9 at an adjacent side wall 1.1 and 1.2. This depression geometry is explained below in detail.

The depression 2 of the longitudinal edge K1 has a depression base 2.1, which transitions with one end 2.12 into the plane of the side wall 1.4. However, the other end 2.11 of the depression base 2.1 transitions into the bulge 3 of the side wall 1.1. This bulge 3 of the side wall 1.1 extends transversely to the longitudinal direction L and has a pronounced and convex curve in the longitudinal direction L in the region of the transition 3.1 of the bulge 3 to the transition 2, with this convex curve flattening in the direction of the opposite-lying longitudinal edge K2 and terminating in an end 3.2, which is located in the region of connection of the inner web 1.5 to said side wall 1.1. At this end 3.2, the bulge 3 transitions into the plane of the side wall 1.1.

Located at the longitudinal edge K2 that lies opposite to the longitudinal edge K1 is the depression 4 with a depression base 4.1, which transitions into the plane of the side wall 1.3 at one end 4.12 and transitions at its opposite-lying end 4.11 into a further bulge 5, which extends likewise transversely to the longitudinal direction L and is flush with the bulge 3. In the same way, this bulge 5 is formed in a pronounced and convex manner in the longitudinal direction L in the transition region 5.1 to the depression 4 and flattens in the direction of the opposite-lying longitudinal edge K1 towards the end 5.2, where the bulge 5 transitions into the plane of the side wall 1.1.

In a corresponding way, the depressions 6 and 8 at the longitudinal edges K3 and K4 are also each formed with a bulge 7 and 9, respectively. Thus, the depression base 6.1 of the depression 6 transitions with one end 6.12 into the plane of the side wall 1.4, whereas the other end 6.11 forms the transition region 7.1 to the bulge 7 of the side wall 1.2. The bulge 7 ends with its end 7.2 in the region of connection of the inner web 1.5 to the side wall 1.2. The depression 8 of the edge K4 transitions with one end 8.12 of its depression base 8.1 into the side wall 1.3 and forms with its other end 8.11 of the depression base 8.1 the transition region 9.1 of the bulge 9 of the side wall 1.2, which has an end 9.2 in the region of connection of the inner web 1.5 to the side wall 1.2.

By means of such a geometry, composed of a depression and a bulge at the adjacent side wall, it is possible to control in a targeted manner the deformation and response behavior, the force-displacement course, and the site of deformation of the hollow profiled element 1 as a side member in a motor vehicle body in the event of input of a crash force due to a motor vehicle collision. Depending on the required absorption of crash energy, this can be adjusted via the geometry, such as, for example, the width, length, height, and/or shape of the bulge.

In particular, it is possible with such a geometry composed of a depression and a bulge to ensure that the crumpling dents start at the desired site. Moreover, it is prevented that such a hollow profiled element, as a side member, is deformed uncontrollably in regions that have a smaller cross section owing to the package.

Such a hollow profiled element can be utilized as side member for a motor vehicle body and can be produced as an extrusion-molded profiled element from, for example, a high-strength aluminum alloy. Of course, other materials can also be utilized, such as, for example, steel or fiber-reinforced composite materials.

Figure 3:
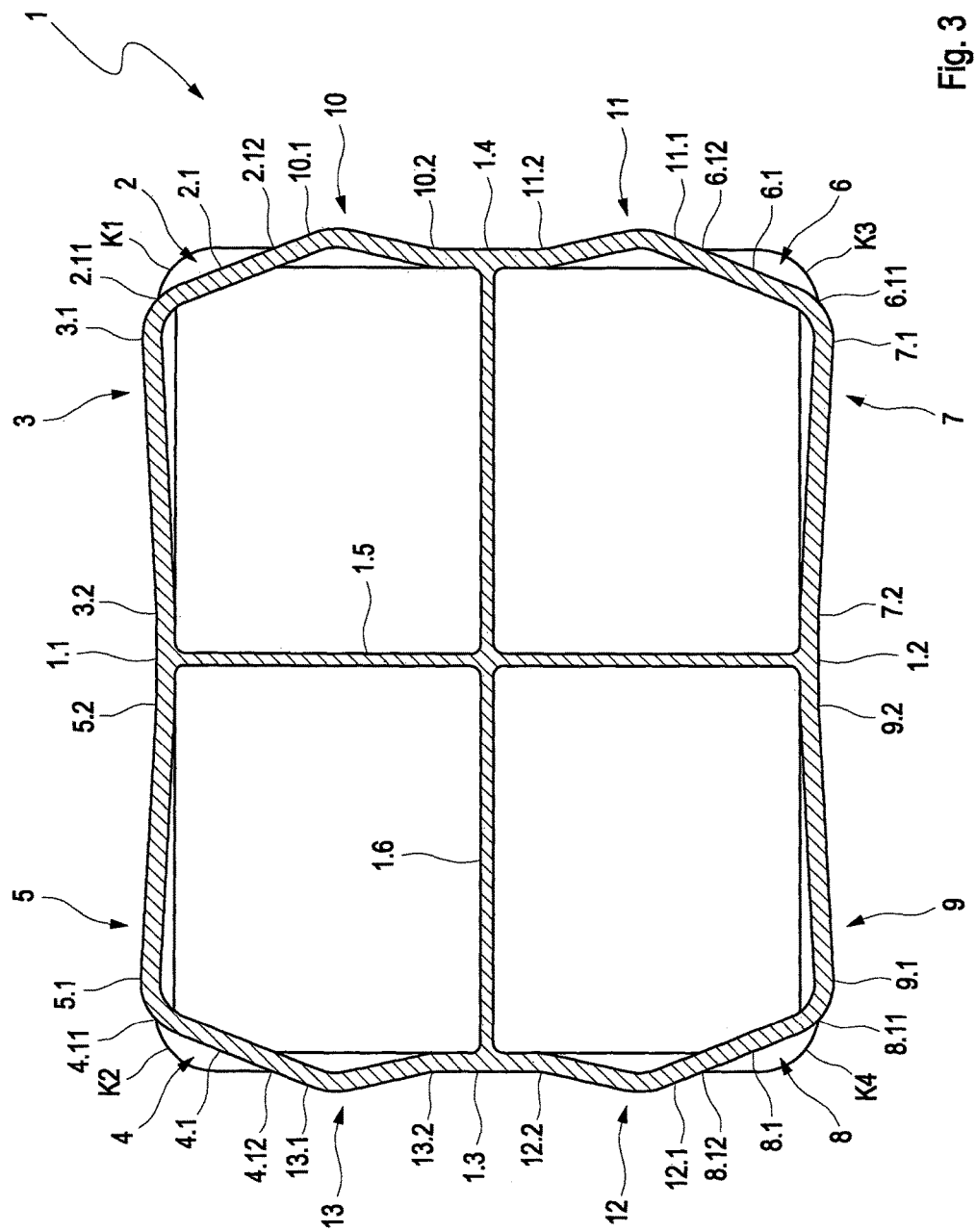

FIG. 3 shows another exemplary embodiment of a hollow profiled element 1 in a multichamber structure. In comparison to the exemplary embodiment in accordance with FIG. 2, this hollow profiled element 1 has a further inner web 1.6 extending transversely to the first inner web 1.5. The depressions 2, 4, 6, and 8 of the hollow profiled element 1 in accordance with FIG. 2 transition into a bulge 3, 5, 7, and 9, respectively, only at an adjacent side wall 1.1 and 1.2. At the other adjacent side walls 1.3 and 1.4, no bulges are provided. In this hollow profiled element 1 according to FIG. 3, these side walls 1.3 and 1.4 also have bulges 10 and 11 or, respectively, 12 and 13.

Thus, the depression 2 transitions at the longitudinal edge K1 with its end 2.12 of the depression base 2.1 into the transition region 10.1 for the bulge 10, which has a pronounced and convex contour transversely to the longitudinal direction L in this transition region 10.1, said contour dropping off flatly in the direction of the opposite-lying longitudinal edge K3 in an end 10.2 in the plane of the side wall 1.4 in the region of connection of the second inner web 1.6 to the side wall 1.4. In the same way, the depression 6 at the longitudinal edge K3 that lies opposite to the depression 2 has a bulge 11, which is introduced into the side wall 1.4 and also has a pronounced and convex shape in the longitudinal direction L in the transition region 11.1 to the depression 6 and drops off in the direction of the region of connection of the second inner web 1.6 to the side wall 1.4 and transitions at its end 11.2 flatly into the plane of the side wall 1.4.

In a corresponding way, corresponding bulges 12 and 13, into which the depressions 8 and 4 transition in the way described above, are also provided on the opposite-lying side wall 1.3.

A hollow profiled element can be produced by means of IHU forming.

REFERENCE SYMBOLS 1 hollow profiled element, side member
1.1 side wall of the hollow profiled element 1
1.2 side wall of the hollow profiled element 1
1.3 side wall of the hollow profiled element 1
1.4 side wall of the hollow profiled element 1
1.5 inner web of the hollow profiled element 1
1.6 inner web of the hollow profiled element 1
2 depression at the longitudinal edge K1 of the hollow profiled element 1
2.1 depression base of the depression 2
2.11 end of the depression base 2.1
2.12 end of the depression base 2.1
3 bulge of the side wall 1.1 of the hollow profiled element 1
3.1 transition of the bulge 3 to the depression 2
3.2 end of the bulge 3

4 depression at the longitudinal edge K2 of the hollow profiled element 1
4.1 depression base of the depression 4
4.11 end of the depression base 4.1
4.12 end of the depression base 4.1
5 bulge of the side wall 1.1 of the hollow profiled element 1
5.1 transition of the bulge 5 to the depression 4
5.2 end of the bulge 3
6 depression at the longitudinal edge K3 of the hollow profiled element 1
6.1 depression base of the depression 6
6.11 end of the depression base 6.1
6.12 end of the depression base 6.1
7 bulge of the side wall 1.2 of the hollow profiled element 1
7.1 transition of the bulge 7 to the depression 6
7.2 end of the bulge 7
8 depression at the longitudinal edge K4 of the hollow profiled element 1
8.1 depression base of the depression 8
8.11 end of the depression base 8.1
8.12 end of the depression base 8.1
9 bulge of the side wall 1.2 of the hollow profiled element 1
9.1 transition of the bulge 9 to the depression 8
9.2 end of the bulge 9
10 bulge of the side wall 1.4 of the hollow profiled element 1
10.1 transition of the bulge 10 to the depression 2
10.2 end of the bulge 10
11 bulge of the side wall 1.4 of the hollow profiled element 1
11.1 transition of the bulge 11 to the depression 6
11.2 end of the bulge 11
12 bulge of the side wall 1.3 of the hollow profiled element 1
12.1 transition of the bulge 12 to the depression 8
12.2 end of the bulge 12
13 bulge of the side wall 1.3 of the hollow profiled element 1
13.1 transition of the bulge 13 to the depression 4
13.2 end of the bulge 13
K1 longitudinal edge of the hollow profiled element 1
K2 longitudinal edge of the hollow profiled element 1
K3 longitudinal edge of the hollow profiled element 1
K4 longitudinal edge of the hollow profiled element 1

The invention claimed is:

1. A hollow profiled element comprising:
a plurality of longitudinal edges, which extend in a longitudinal direction and are connected by side walls, in which a first longitudinal edge has at least one depression extending inward into the hollow profiled element from a surface of the first longitudinal edge and terminating in a depression base, the depression base of which extends transversely to the longitudinal direction on a surface of the hollow profiled element and runs at an angle to the side walls forming the first longitudinal edge, said angle being an angle in a transverse direction on the surface of the hollow profiled element, wherein a first side wall forming the longitudinal edge has a transversely extending first bulge in the region of the depression and arranged adjacent to the depression, the first bulge extending outward from the hollow profiled element, with the depression base transitioning into the bulge at one end of the depression base in the region of said first side wall, and the first bulge is designed with a shape that has a convex form in the transition to the depression and drops to the level of the first side wall before an opposite-lying longitudinal edge is reached, wherein the hollow profiled element has a consistent thickness over a region defined by the first side wall having the first bulge and the first longitudinal edge having the depression.

2. The hollow profiled element according to claim 1, wherein a second side wall forming a second longitudinal edge has a transversely extending second bulge in the region of the depression, the transversely extending second bulge extending outward from the hollow profile element and arranged on the opposite side of the depression base from the first bulge, with the depression base transitioning into the second bulge at an opposite end of the depression base in the region of the second side wall.

3. The hollow profiled element according to claim 1, wherein the hollow profiled element is designed for forming a multichamber structure with an inner web that extends in the longitudinal direction and connects the first side wall having the first bulge to an opposite-lying side wall, and
the first bulge is formed such that one end of the first bulge is disposed in the region of connection of the inner web to said first side wall.

4. The hollow profiled element according to claim 1, wherein at the opposite-lying longitudinal edge, which is formed by the first side wall having the first bulge, a second depression with a third bulge is formed, and
the third bulge is formed with one end in the region of connection of an inner web to the first side wall.

5. The hollow profiled element according to claim 4, wherein the first bulge and the third bulge are each formed so that each bulge follows a course that is flush with the other bulge transversely in the longitudinal direction, such that an uninterrupted transition is provided between the first bulge and the third bulge.

6. The hollow profiled element according to claim 1, wherein the hollow profiled element is designed as a side member or as a cross member for a motor vehicle body.

* * * * *